(12) United States Patent
Nammi et al.

(10) Patent No.: US 10,420,089 B2
(45) Date of Patent: Sep. 17, 2019

(54) ADAPTIVE TWO-STAGE DOWNLINK CONTROL CHANNEL STRUCTURE FOR CODE BLOCK GROUP BASED FIFTH GENERATION (5G) OR OTHER NEXT GENERATION SYSTEMS

(71) Applicant: AT&T Intellectual Property I, L.P., Atlanta, GA (US)

(72) Inventors: SaiRamesh Nammi, Austin, TX (US); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 21 days.

(21) Appl. No.: 15/674,465

(22) Filed: Aug. 10, 2017

(65) Prior Publication Data
US 2019/0053201 A1 Feb. 14, 2019

(51) Int. Cl.
*H04W 4/00* (2018.01)
*H04W 72/04* (2009.01)
*H04L 1/18* (2006.01)
*H04L 1/00* (2006.01)

(52) U.S. Cl.
CPC ......... *H04W 72/042* (2013.01); *H04L 1/0072* (2013.01); *H04L 1/1861* (2013.01); *H04L 1/1896* (2013.01)

(58) Field of Classification Search
CPC .......................... H04W 72/042; H04L 1/1861
See application file for complete search history.

(56) References Cited

U.S. PATENT DOCUMENTS

| 7,706,334 B2 | 4/2010 | Yun et al. |
| 7,752,519 B2 | 7/2010 | Yeo et al. |
| 7,787,828 B2 | 8/2010 | Horiguchi et al. |

(Continued)

FOREIGN PATENT DOCUMENTS

| EP | 2 885 889 A2 | 6/2015 |
| JP | 2007-006382 A | 1/2007 |

(Continued)

OTHER PUBLICATIONS

Khosravirad et al., "Flexible Multi-Bit Feedback Design for HARQ Operation of Large-Size Data Packets in 5G", IEEE Proceedings of VTC—2017 spring, Jun. 2017, 6 pages.

(Continued)

*Primary Examiner* — Clemence S Han
(74) *Attorney, Agent, or Firm* — Amin, Turocy & Watson, LLP

(57) ABSTRACT

An adaptive two-stage downlink control channel structure is utilized for control channel transmission with code block group (CBG) retransmission for 5G and other next generation wireless systems. In an aspect, the first stage of the two-stage downlink control channel structure utilizes a defined format (e.g., having a fixed length) and provides information that is employable to determine the length and/or coding scheme of the second stage. In another aspect, the second stage of the two-stage downlink control channel structure utilizes a variable length/size to indicate the CBGs that are scheduled to be retransmitted (e.g., by employing a variable length bitmap). As an example, the length/size is varied based on a length/size of a transport block, from which the CBGs have been generated.

20 Claims, 10 Drawing Sheets

(56) References Cited

U.S. PATENT DOCUMENTS

| | | | |
|---|---|---|---|
| 8,081,696 | B2 | 12/2011 | Sun et al. |
| 8,189,559 | B2 | 5/2012 | Pi et al. |
| 8,379,738 | B2 | 2/2013 | Pi et al. |
| 8,537,909 | B2 | 9/2013 | Kim et al. |
| 8,539,298 | B2 | 9/2013 | Shimanuki et al. |
| 9,032,267 | B2 | 5/2015 | Shimanuki et al. |
| 9,154,267 | B2 | 10/2015 | He et al. |
| 9,236,918 | B2 | 1/2016 | Toda et al. |
| 9,294,959 | B2 | 3/2016 | Seyama et al. |
| 9,485,072 | B2 | 11/2016 | Park |
| 9,525,513 | B2 | 12/2016 | Pi et al. |
| 2002/0196812 | A1 | 12/2002 | Yamaguchi et al. |
| 2012/0002657 | A1* | 1/2012 | Seyama ............... H04L 1/1854 370/338 |
| 2012/0005550 | A1* | 1/2012 | Ito ........................ H04L 1/0003 714/748 |
| 2016/0226643 | A1 | 8/2016 | Mallik et al. |
| 2017/0142593 | A1 | 5/2017 | Seo et al. |
| 2017/0207895 | A1 | 7/2017 | Yang et al. |
| 2018/0270023 | A1* | 9/2018 | Jiang .................... H04L 1/1819 |
| 2018/0278399 | A1* | 9/2018 | Sundararajan ........ H04L 1/1635 |
| 2018/0287744 | A1* | 10/2018 | Sundararajan ............ H04L 1/14 |
| 2018/0323911 | A1* | 11/2018 | Meng .................... H04L 1/1829 |
| 2018/0367259 | A1* | 12/2018 | Hsieh .................... H04L 1/1812 |
| 2018/0368113 | A1* | 12/2018 | Gupta ................ H04W 72/042 |

FOREIGN PATENT DOCUMENTS

| | | |
|---|---|---|
| KR | 2003-0060387 A | 7/2003 |
| WO | 2013/026345 A1 | 2/2013 |
| WO | 2014/031450 A2 | 2/2014 |
| WO | 2016/105173 A1 | 6/2016 |
| WO | 2017/095289 A1 | 6/2017 |

OTHER PUBLICATIONS

Lozano, "Contribution to wireless access optimization and dynamic enhancement of WCDMA networks", Universitat Politecnica de Catalunya, Barcelona, Jul. 2008, 262 pages.

Szczecinski et al., "Variable-rate Retransmissions for Incremental Redundancy Hybrid ARQ" preprint arXiv:1207.0229v1 [cs.IT] 1 Jul. 3, 2012, 22 pages.

Ikuno et al., "LTE Rate Matching Performance with Code Block Balancing" Wireless Conference 2011—Sustainable Wireless Technologies (European Wireless), 11th European. VDE, 2011, 3 pages.

El Hamss et al., "Increasing the throughput of HARQ via multi-packet Transmission" Global Communications Conference (GLOBECOM), IEEE, 2014, pp. 1485-1491.

International Search Report and Written Opinion dated Nov. 6, 2018 for PCT Application No. PCT/US2018/045501, 15 pages.

Huawei, HiSilicon. "Scheduling mechanisms for CBG-based re-transmission" 3GPP Draft; R1-1709967, Jun. 2017, 3rd Generation Partnership Project (3GPP), [http://www.3gpp.org/ftp/tsg_ran/WG1_RL1/TSGR1_AH/NR_AH_1706/Docs/], 3 pages.

Sequans. "CBG based retransmission" 3GPP Draft; R1-1711531—CBG based retransmission, Jun. 2017, 3rd Generation Partnership Project (3GPP), [http://www.3gpp.org/ftp/tsg_ran/WG1_RL1/TSGR1_AH/NR_AH_1706/Docs/], 5 pages.

Qualcomm Incorporated. "DCI considerations for CBG-based (re)-Transmissions" 3GPP Draft; R1-1711203-CBG-DCI-reduction, Jun. 2017, 3rd Generation Partnership Project (3GPP), [http://www.3gpp.org/ftp/tsg_ran/WG1_RL1/TSGR1_AH/NR_AH_1706/Docs/], 5 pages.

* cited by examiner

ADAPTIVE TWO-STAGE DOWNLINK CONTROL CHANNEL STRUCTURE FOR CODE BLOCK GROUP BASED FIFTH GENERATION (5G) OR OTHER NEXT GENERATION SYSTEMS

TECHNICAL FIELD

The subject disclosure relates to wireless communications, e.g., adaptive two-stage downlink control channel structure for code block group based fifth generation (5G) or other next systems.

BACKGROUND

Data communication is prone to errors due to various factors such as, traffic congestion, delay, packet drop, non-receipt of acknowledgements, signaling factors, etc. In one example, forward error correction (FEC) is utilized to prevent these errors. When forward error correction is applied to an information block, additional parity bits, that are added to the information bits, are utilized to protect the information bits when passed through a communication channel. Based on the performance in additive white Gaussian channels (AWGN), conventional third generation partnership project (3GPP) systems utilize low-density parity check (LDPC) codes as the channel coding scheme for encoding a data channel in downlink and uplink direction. The LDPC codes are a class of linear block codes, wherein the parity check matrix is sparse (e.g., having a low density). When iterative decoding is applied at the receiver, these codes are known to perform close to Shannon capacity with reduced decoding complexity.

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G, or other next generation, standards for wireless communication.

DETAILED DESCRIPTION

Figure 1:
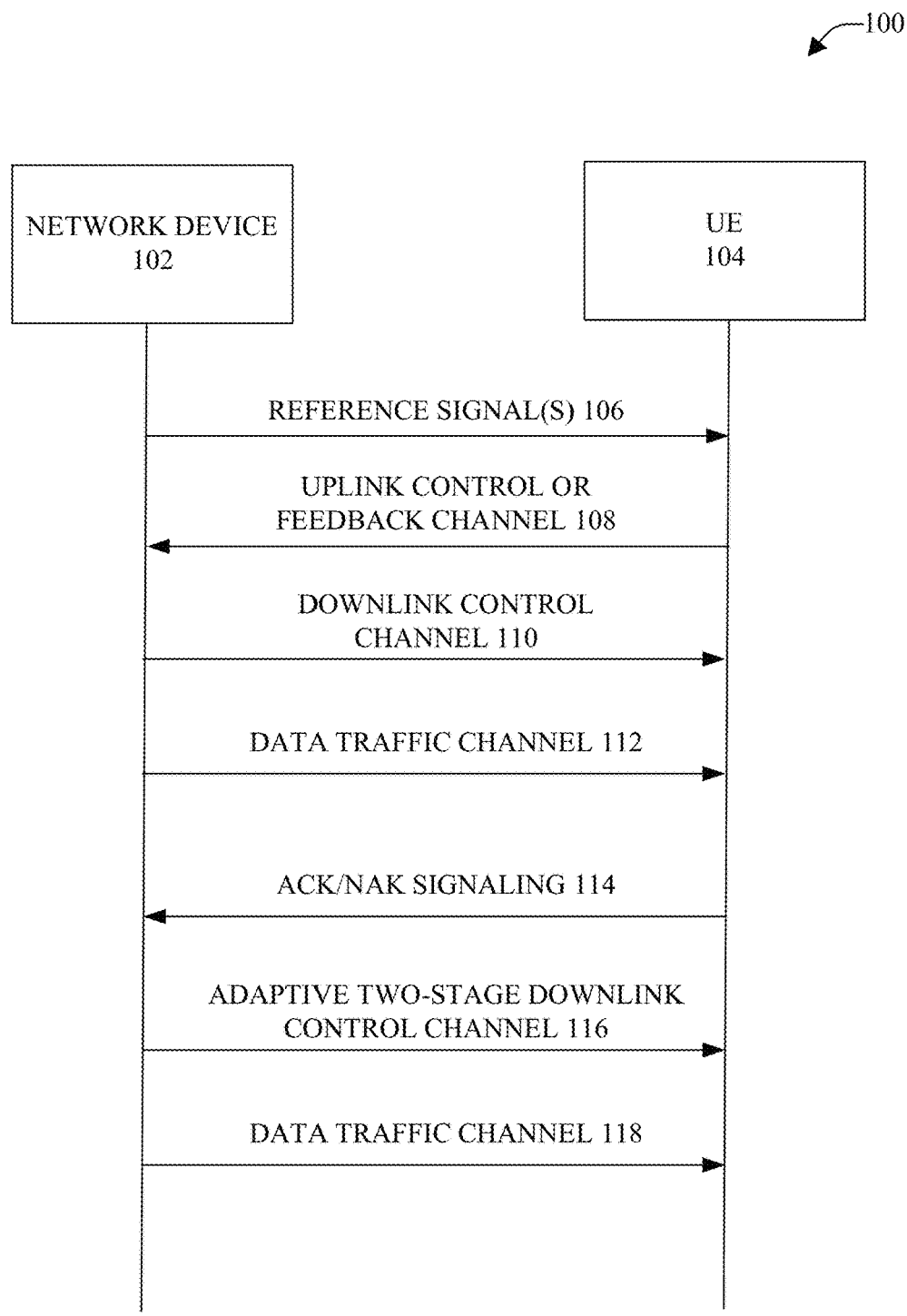
FIG. 1 illustrates an example is an example message sequence flow chart that can facilitate downlink data transfer.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "node," "platform," "server," "controller," "entity," "element," "gateway," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can comprise input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can comprise but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "communication device," "mobile device," "mobile station," and similar terminology, refer to a wired or wireless communication-capable device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Data and signaling streams can be packetized or frame-based flows. Further, the terms "user," "subscriber," "consumer," "customer," and the like are employed interchangeably throughout the subject specification, unless context warrants particular distinction(s) among the terms. It should be noted that such terms can refer to human entities or automated components supported through artificial intelligence (e.g., a capacity to make inference based on complex mathematical formalisms), which can provide simulated vision, sound recognition and so forth.

The systems and methods disclosed herein relate to communication systems with hybrid automatic repeat requests (HARM), and one or more embodiments relate to control channel transmission with code block group transmission for wireless systems. During code block segmentation, a transport block is segmented into smaller code blocks, each having a specified length/size. Since the length of the transmission block varies, the number of code blocks generated during each transmission is variable. If a receiver (e.g., user equipment (UE)) receives a set of the code blocks with errors, the receiver can transmit a negative acknowledgement (NAK) signal for the failed code blocks with one or more groups called code block groups (CBGs). During retransmission of the CBGs, the systems and methods disclosed herein adhere to an adaptive two-stage downlink control channel structure, wherein a first stage has a defined (e.g., fixed) length and message structure to specify scheduling parameters, (e.g., the transfer block length), and a second stage has a variable length/size to explicitly indicate the CBGs that are to be retransmitted (e.g., by employing a variable length bitmap). Accordingly, the receiver can initially decode the first stage and determine, based on the transfer block length, the length/size of the second stage. Further, the receiver can determine, based on an analysis of the first stage, a modulation scheme utilized for the second stage. Based on the determined data, the receiver can decode the second stage of the downlink control channel.

It should be noted that although various aspects and embodiments have been described herein in the context of 5G, universal mobile telecommunications system (UMTS), and/or long term evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, code division multiple access (CDMA), Wi-Fi, worldwide interoperability for microwave access (WiMAX), general packet radio service (GPRS), enhanced GPRS, third generation partnership project (3GPP), LTE, third generation partnership project 2 (3GPP2) ultra mobile broadband (UMB), high speed packet access (HSPA), evolved high speed packet access (HSPA+), high-speed downlink packet access (HSDPA), high-speed uplink packet access (HSUPA), Zigbee, or another IEEE 802.XX technology. Additionally, substantially all aspects disclosed herein can be exploited in legacy telecommunication technologies.

As used herein, "5G" can also be referred to as New Radio (NR) access. Accordingly, systems, methods, and/or machine-readable storage media for facilitating improved communication coverage for 5G systems are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Referring initially to FIG. 1, there illustrated is an example message sequence flow chart 100 that can facilitate downlink data transfer, according to one or more aspects of the disclosed subject matter. As illustrated, the non-limiting message sequence flow chart 100 represents a message sequence between a network device 102 and a user equipment (UE) 104. In one example, the network device 102 can comprise most any radio access network (RAN) device, for example, a network controller, an access point (e.g., eNodeB, gNodeB, etc.) or any number of other network components of a communication network (e.g., cellular network). In another example, the UE 104 can comprise, but are is limited to most any industrial automation device and/or consumer electronic device, for example, a tablet computer, a digital media player, a wearable device, a digital camera, a media player, a cellular phone, a personal computer, a personal digital assistant (PDA), a smart phone, a laptop, a gaming system, set top boxes, home security systems, an Internet of things (IoT) device, a connected vehicle, at least partially automated vehicle (e.g., drones), etc.

During downlink data transfer, one or more pilot signals and/or reference signals 106 can be transmitted from the network device 102 to the UE 104. As an example, the one or more pilot signals and/or reference signals 106 can be beamformed or non-beamformed. According to some implementations, the one or more pilot signals and/or reference signals 106 can be cell (e.g., network device) specific and/or mobile device specific. Based on the one or more pilot signals and/or reference signals 106, the UE 104 can compute the channel estimates and can determine (e.g., can compute) the one or more parameters needed for channel state information (CSI) reporting, as indicated at 108. The CSI report can comprise, for example, a channel quality indicator (CQI), a precoding matrix index (PMI), rank information (RI), the best subband indices, best beam indices, and so on, or any number of other types of information.

The CSI report can be sent from the UE 104 to the network device 102 via a feedback channel (e.g., uplink control or feedback channel 108). The CSI report can be sent on a periodic basis or on-demand (e.g., aperiodic CSI reporting). The network device 102, which can comprise a scheduler, can use the CSI report for choosing the parameters for scheduling of the UE 104. The network device 102 can send the scheduling parameters to the UE 104 in a downlink control channel (e.g., downlink control channel 110), referred to as the Physical Downlink Control Channel (PDCCH). The PDCCH carries information about the scheduling grants, such as but not limited to, number of multiple input, multiple output (MIMO) layers scheduled, transport block sizes, modulation for each codeword, parameters related to hybrid automatic repeat request (HARQ), sub band locations and/or precoding matrix index corresponding to that sub bands. In one aspect, the PDCCH employs a defined format (e.g., downlink control information (DCI) format) to transmit the following information: Localized/Distributed virtual resource block (VRB) assignment flag; Resource block assignment; Modulation and coding scheme; HARQ process number; New data indicator; Redundancy version (RV); Transmit Power Control (TPC) command for uplink control channel; Downlink assignment index; Precoding matrix index; Number of layers; etc.

After the scheduling parameter information has been transmitted, the actual data transfer can take place from the network device 102 to the UE 104 over the data traffic channel 112. In NR, for data transfer, code block segmentation can be applied prior to encoding the transport block (e.g., communication data that is to be transferred). Code block segmentation refers to a process of dividing the transport block into smaller code blocks, the sizes of which should correspond to a code block size supported by the encoder.

When the code blocks are received by the UE 104, the UE 104 can utilize error correction techniques (e.g., forward error correction (FEC)) to determine if any errors have occurred during transmission. If such errors are not detected and the code blocks have been decoded correctly, the UE 104 can provide an acknowledge (ACK) message to the network device 102. Alternatively, if one or more of the code blocks have errors, the UE 104 can provide a negative acknowledgement (NAK) message that specifies one or more code block groups (CBGs) belonging to a specific HARQ process number that comprise code blocks that have been received with errors (e.g., via ACK/NAK signaling 114 communicated over an uplink control channel). In NR, the uplink control channel can carry information about Hybrid Automatic Repeat Request-Acknowledgement (HARQ-ACK) information corresponding to the downlink data transmission, and channel state information. The channel state information can consists of rank indicator (RI), channel quality indicator (CQI), and precoding matrix indicators (PMI). Either physical uplink control channel (PUCCH) or physical uplink shared channel (PUSCH) can be used to carry this information. Note that the PUCCH reporting can be periodic and the periodicity of the PUCCH can be configured by the higher layers, while the PUSCH reporting can be aperiodic.

According to an embodiment, on receiving a NAK indication for one or more CBGs, the network device 102 can retransmit the specified CBGs to the UE 104. To initiate the retransmission, the network device 102 can transmit control data via an adaptive two-stage downlink control channel 116, wherein a first stage can utilize the same format (e.g., DCI format), length, and/or size as that utilized by the downlink control channel 110, and a second stage can utilize an adaptable length/size. Moreover, the first stage can comprise control information, such as, but not limited to, transport block length/size, localized/distributed VRB assignment flag, resource block assignment, modulation and coding scheme, HARQ process number, new data indicator, RV, TPC command for uplink control channel, downlink assignment index, precoding matrix index, number of layers; etc. In an aspect, the second stage can comprise data that indicates explicitly the CBGs that are scheduled to be retransmitted. On receiving this information, the UE 104 can first decode the first stage of the downlink control channel and determine the total number of CBGs that will be transmitted and the corresponding modulation scheme for the CBGs. Further, the UE 104 can analyze the first stage to determine a length of the second stage and accordingly decodes the second stage of the downlink control channel. The data retransmission (of the selected CBGs) can be performed via the data traffic channel 118.

Although the disclosure has been described with respect to a downlink control channel structure, it is noted that the disclosure is not so limited and that the aspects described herein can be applied to uplink and/or side link data transmission schemes. In addition, the embodiments disclosed herein are applicable to single carrier and/or multi carrier (e.g., carrier aggregation) transmission schemes.

Figure 2:
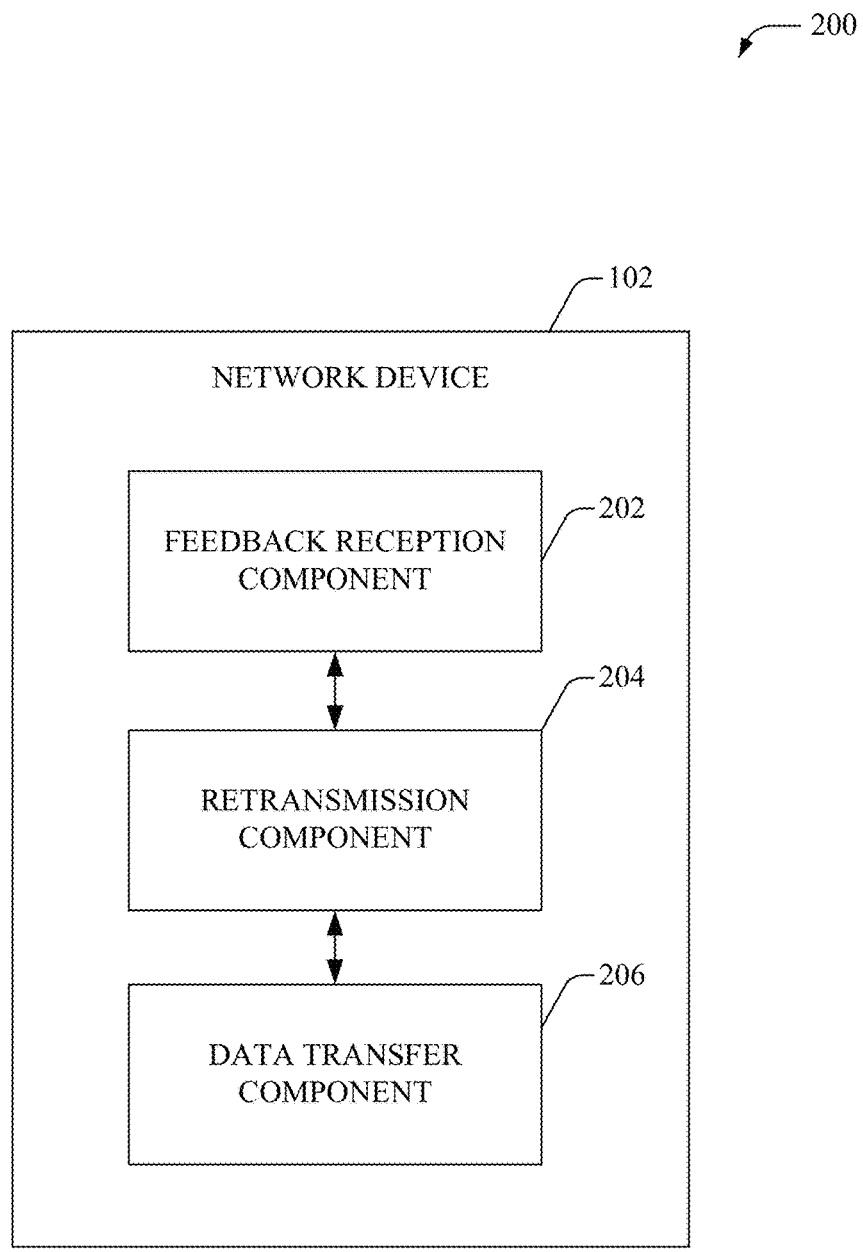
FIG. 2 illustrates an example system transmits a control signal that adheres to an adaptive two-stage downlink control channel structure for code block group (CBG)-based retransmissions.

Referring now to FIG. 2, there illustrated is an example system 200 that transmits a control signal that adheres to an adaptive two-stage downlink control channel structure for CBG-based retransmissions, in accordance with an aspect of the subject disclosure. It is noted that the network device 102 can comprise functionality as more fully described herein, for example, as described above with regard to system 100. The various aspects discussed herein can facilitate improved coverage in a wireless communications system. Although system 200 has been described with respect to a 5G network, it is noted that the subject disclosure is not limited to 5G networks and can be utilized in most any communication network.

During HARQ, 3GPP system can utilize mechanisms to retransmit failed code blocks if the receiver communicates the failed code blocks. Typically, the code block segments are grouped into one or more code block groups and the receiver (e.g., UE 104) can send an HARQ ACK/NAK for these code block group. If any code block segments within a CBG is in error, then the receiver can inform the transmitter (e.g., network device 102), via the uplink feedback channel, that the CBG belonging to a specific HARQ process number is in error. In response, the transmitter can resend all the HARQ of all the code block segments within that CBG. The signaling overhead that occurs during the conventional approach for indicating the CBGs, which are scheduled for retransmission, is extremely high. For example, if the network has configured the number of CBGs (N) for the highest number of resources elements, for example, 6600. Then N=6600*8*14*4/8448=90.2344. Consider the example scenario wherein the network configures N=90. In this example scenario, for every retransmission, the network device will send a bitmap of length equal to 90 bits in the downlink control channel, wherein the bit positions corresponding to the failed CBGs are set to 1 and the bit positions corresponding to the accurately received CBGs are set to 0, which would indicates to the UE that those CBGs are re transmitted. Transmitting a bitmap, having a length corresponding to a maximum number of CBGs that can be handled by the system, during each retransmission (regardless of the total number of CBGs and/or the resource allocation) can incur significant overhead for the downlink control channel. In this example scenario, the downlink control channel will occupy more resources thereby reducing the number of resources for data traffic channels. This in turn reduces the throughput and capacity for the system.

Referring back to FIG. 2, there illustrated is system 200 that adapts the size/length of the bitmap to reduce signaling overhead. In one aspect, the total number of CBGs that are transmitted to a UE can vary, for example, when resource allocation is different during data transmission (e.g., due to channel conditions), when transmission block length is different, etc. For example, at time T1, the total number of CBGs can be 4 and at time T2, the total number of CBGs can be 20. System 200 utilizes fewer number of resources for the downlink control channel (than conventional systems) while exploiting the benefits of the CBG-based transmission.

In one aspect, the network device 102 can transfer data to a UE by setting up a data traffic channel (e.g., via signaling 106-112 in FIG. 1). As an example, the network device 102 can comprise a feedback reception component 202 that receives, from a UE, HARQ-ACK/NAK feedback for the data transfer. As an example, the HARQ-ACK/NAK feedback can indicate the CBGs that have been received by the UE accurately and the CBGs that have been received with an error. In one aspect, a retransmission component 204 can be utilized to determine the resources for the CBGs that are to be retransmitted (e.g., the CBGs that have been received with an error) and determine modulation and/or RV for these CBGs. Further, a data transfer component 206 can be utilized to transmit control information to facilitate the retransmission via an adaptive two-stage downlink control channel. In an aspect, the first stage of the adaptive two-stage downlink control channel utilizes the same downlink control channel structure as that utilized during the original data transfer. However, the second stage of the adaptive two-stage downlink control channel utilizes a variable length to provide an explicit indication of the CBGs that are scheduled for retransmission. For example, the second stage comprises a bitmap of the total number of CBGs (corresponding to the particular transport block), wherein the CBGs that are to be retransmitted are flagged. As an example, the bitmap can be generated by the retransmission component 204.

According to an example, a subsequent data transfer from the network device 102 to the UE can comprise different number of code blocks (e.g., due to a difference in the length size of the transport block) and thus different number of CBGs. If retransmissions are requested for a set of these CBGs, the retransmission component 204 can generate another bitmap (e.g., having a different length that the previously sent bitmap) based on the new number of CBGs. For example, if the total number of CBGs has increased, the length of the bitmap will be longer, while if the total number of CBGs has decreased, the length of the bitmap will be shorter than the previously sent bitmap.

In some embodiments, the network device 102 can comprise a radio network node that can comprise any type of network node that serves one or more UEs and/or that is coupled to other network nodes or network elements or any radio node from where the one or more UEs receive a signal. Examples of radio network nodes are Node B, base station (BS), multi-standard radio (MSR) node such as MSR BS, eNodeB, gNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces (APIs) and move the network core towards an all Internet protocol (IP), cloud based, and software driven telecommunications network. The SDN controller can work with, or take the place of Policy and Charging Rules Function (PCRF) network elements so that policies such as quality of service and traffic management and routing can be synchronized and managed end to end.

To meet the huge demand for data centric applications, 4G standards can be applied to 5G, also called NR access. 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Typically, the communication link-system performance is enhanced with the use of forward error correction (FEC) code. When FEC is applied to the transport block, additional parity bits are added to the information bits. These additional parity bits protect the information bits when passed through a communication channel. Based on the performance in additive white Gaussian channels (AWGN), low-density parity check (LDPC) codes can be utilized as the channel coding scheme for encoding data channel in downlink and/or uplink direction. However, it is noted that the specification is not limited to utilization of LDPC codes. LDPC codes are a class of linear block codes where the parity check matrix is sparse (low density of 1 s). When iterative decoding is applied at the receiver, these codes are known to perform close to Shannon capacity with less decoding complexity.

Figure 3:
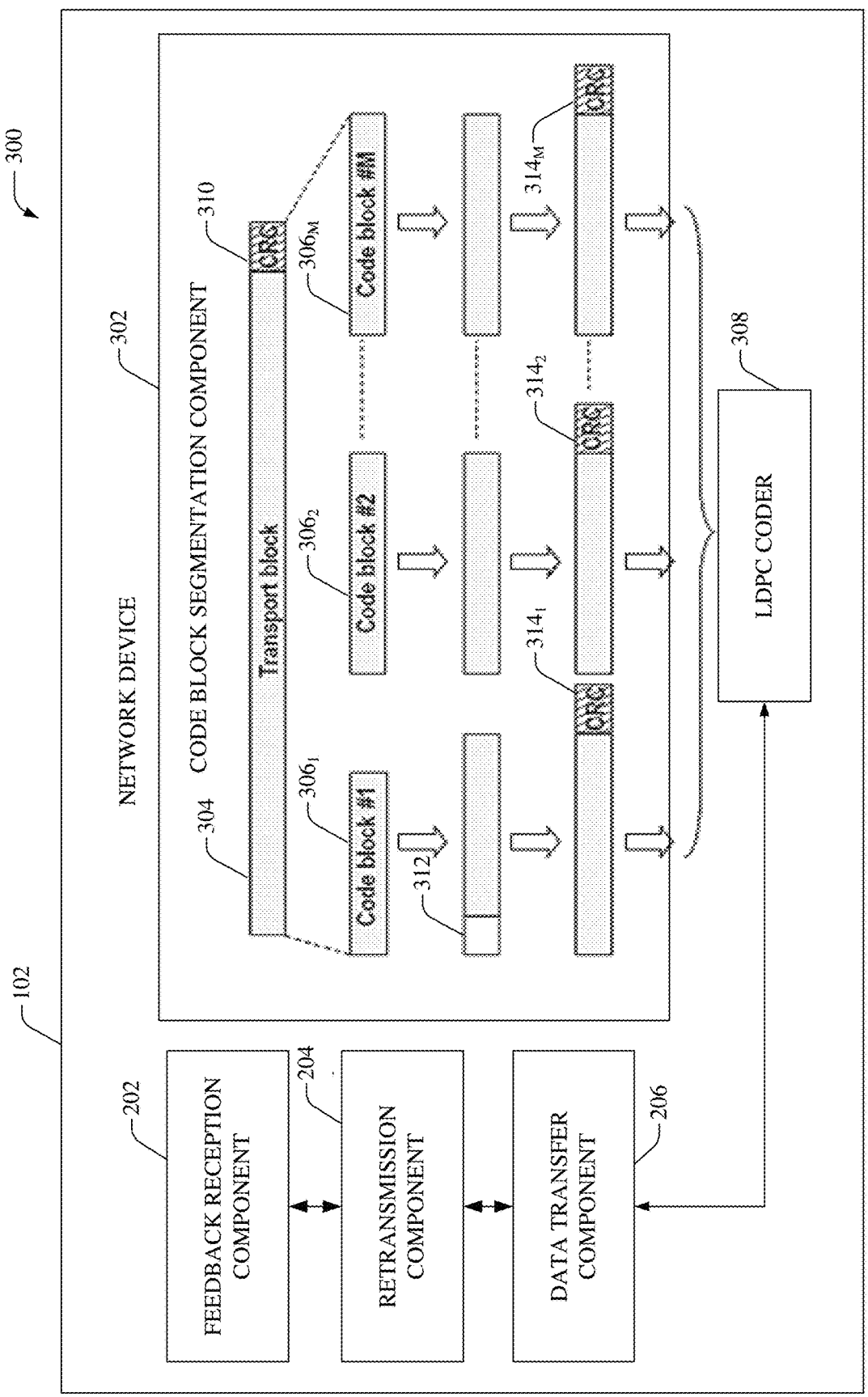
FIG. 3 illustrates an example system that determines an adaptive two-stage downlink control channel structure for CBG-based retransmissions.

Referring now to FIG. 3, there illustrated is an example system 300 that determines an adaptive two-stage downlink control channel structure for CBG-based retransmissions, in accordance with an aspect of the subject disclosure. It is noted that the network device 102, feedback reception component 202, retransmission component 204, and data transfer component 206 can comprise functionality as more fully described herein, for example, as described above with regard to systems 100 and 200.

According to an aspect, a code block segmentation component 302 can be utilized to perform physical-layer processing during data transfer. As an example, in NR the transport block 304 can be encoded using a LDPC coder 308. In the first step of the physical-layer processing, a M-bit (e.g., wherein M can be most any integer) cyclic redundancy check (CRC) is calculated for and appended to each transport block, for example, CRC 310 appended to transport block 304. The CRC allows for UE-side detection of errors in the decoded transport block. The corresponding error indication can, for example, be used by the downlink hybrid-ARQ protocol as a trigger for requesting retransmissions (e.g., received by the feedback reception component 202). According to an aspect, if the transport block 304, including the transport-block CRC 310, exceeds a defined code block size (e.g., 8448), the code block segmentation component 302 performs segmentation of the transport block 304 before the LDPC coding. As an example, the segmentation comprises dividing the transport block 304 into smaller code blocks $306_1$-$306_M$, the sizes of which can be selected to match a set of code-block sizes supported by the LDPC coder 308. In order to ensure that a transport block of arbitrary size can be segmented into code blocks that match the set of available code-block sizes, the code block segmentation component 302 can optionally insert "dummy" filler bits 312 at the head of the first code block.

Further, the code block segmentation component 302 can append additional CRCs $314_1$-$314_M$ to the respective the code blocks $306_1$-$306_M$. This allows for early detection of correctly decoded code blocks at the UE. It is noted that in the case of a single code block when no segmentation is needed, no additional code-block CRC is applied; code-block segmentation is typically applied to large transport blocks for which the relative extra overhead due to the additional transport block CRC is small. Information about the transport-block size is provided to the UE as part of the scheduling assignment transmitted on the PDCCH control channel. Based on this information, the UE can determine the code block size and number of code blocks. The UE can thus, based on the information provided in the scheduling assignment, straightforwardly undo or assemble the code block segmentation and recover the decoded transport blocks.

According to an aspect, if one or more of the code blocks $306_1$-$306_M$ are not decoded correctly by the UE, the UE can request retransmission of failed CBGs that comprise the one or more of the code blocks $306_1$-$306_M$. In an aspect, during retransmission, the retransmission component 204 can dynamically generate a bitmap based on parameters, such as, but not limited to, a size of the transport block 304, and/or a total number of code blocks generated (M), etc. Moreover, the size of the bitmap is optimized based on the parameters.

Further, in one aspect, the LDPC coder encodes the failed CBGs in the second stage before retransmission. As an example, a Reed-Muller code is utilized if the length of the CBGs equal or less than 11 and uses the same code as that used in stage one (e.g., polar code). In another example, the same polar code is utilized for encoding the first stage and the second stage.

Figure 4:
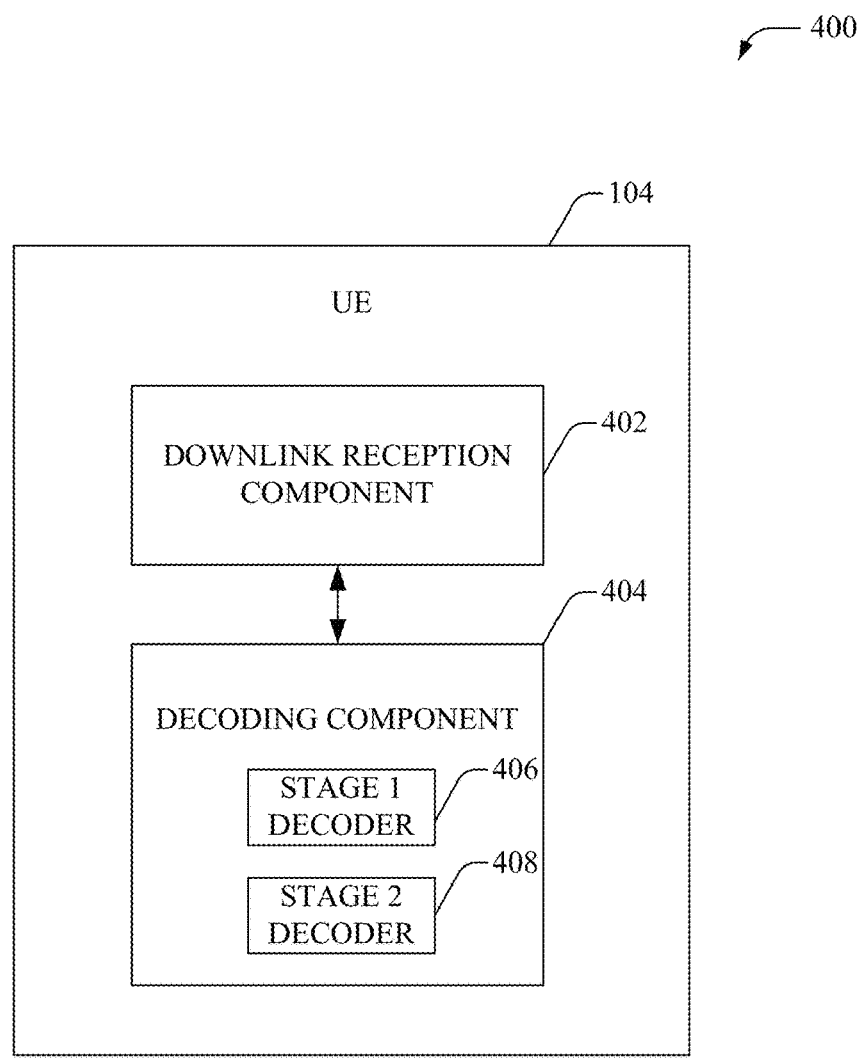
FIG. 4 illustrates an example system that receives a control signal that adheres to an adaptive two-stage downlink control channel structure for CBG-based retransmissions.

Referring now to FIG. 4, there illustrated is an example system 400 that receives a control signal that adheres to an adaptive two-stage downlink control channel structure for CBG-based retransmissions, according to an aspect of the subject disclosure. It is noted that the UE 104 can comprise functionality as more fully described herein, for example, as described above with regard to systems 100-200. Although system 400 has been described with respect to a NR network, it is noted that the subject disclosure is not limited to NR networks and can be utilized in most any communication network.

In one aspect, during data communication a downlink reception component 402 can receive scheduling parameters related to a data transfer via a downlink control channel. Subsequent to the receiving of the scheduling parameters, the downlink reception component 402 can receive data transfer of code blocks that have been generated during code block segmentation applied to a transport block. A decoding component 404 can decode the code blocks and provide ACK/NAK feedback (e.g., HARQ-ACK/NAK) to the network device based on errors determined during the decoding.

Consider an example scenario wherein one or more of the code blocks are not decoded properly. In this example scenario, the UE 104 can provide a NAK for failed CBGs that comprise the one or more of the code blocks. In response, the network device can transmit, via the downlink control channel, a control signal that has an adaptive two-stage control channel structure. In one aspect, the downlink reception component 402 can receive the control signal and the decoding component 404 can decode the two stages. In one example, a stage1 decoder can decode the first stage of control signal and determine parameters, such as, but not limited to, a number of resources allocated for re-transmission, a corresponding modulation scheme utilized for the CBGs, a size/length of the transport block, etc. Based on an analysis of the parameters, the UE 104 can determine a number of CBGs that are to be retransmitted. For example, the number of CBGs that are to be retransmitted can be determined by dividing the length of the transport block by a defined number (e.g., a maximum code-block size). According to an aspect, the first stage adheres to the same (or substantially similar) format and/or structure as the signal used to transmit the scheduling parameters during the data transmission.

For identifying an explicit indication of CBGs that are to be retransmitted (e.g., a bitmap wherein the CBGs that are to be retransmitted have been flagged), the stage 2 decoder 408 can decode the second stage of the control channel. Since the length of the CBG indication is determined (e.g., based on the length of the transport block), most any decoding algorithms, for example, Reed-Muller decoding, maximum likelihood decoding, and/or list decoding for polar codes, etc. can be utilized. Based on the decoded information the UE 104 can facilitate reception of the retransmitted CBGs.

Figure 5:
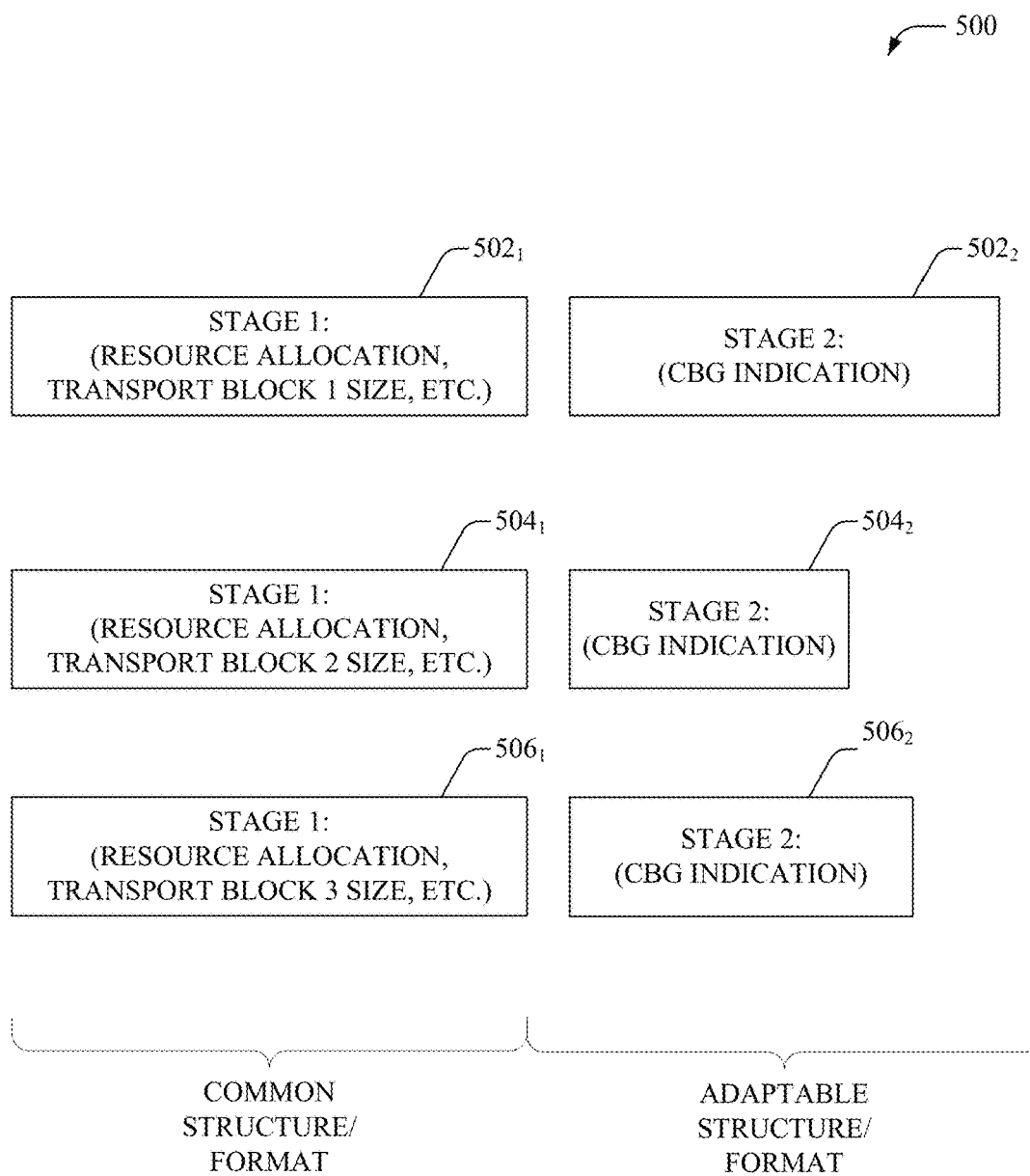
FIG. 5 illustrates example adaptive two-stage downlink control channel structures in accordance with the subject embodiments.

Referring now to FIG. 5, there illustrated are example adaptive two-stage downlink control channel structures 500 in accordance with the subject embodiments. Although downlink control channel structures for retransmissions associated with only three transport blocks (having different lengths) is shown, it is noted that the subject disclosure is not limited to three different downlink control channel structures.

In an embodiment, control channel structures $502_1$-$502_2$ depict an example adaptive two-stage downlink control channel structure for retransmission of CBGs for a transport block 1 (e.g., having length X; wherein X is most any integer). During this retransmission (e.g., at time T1), the first stage $502_1$ adheres to the same (or substantially similar) structure as that adhered to by the downlink control channel during the transmission (e.g., first transmission) of the CBGs, while the second stage $502_2$ has a length of A bits (e.g., wherein A is most any integer that is determined based on the total number of CBGs generated for the transport block 1). In another embodiment, control channel structures $504_1$-$504_2$ depict an example adaptive two-stage downlink control channel structure for retransmission of CBGs for a transport block 2 (e.g., having length Y; wherein Y is most any integer). During this retransmission (e.g., at time T2), the first stage $504_1$ adheres to the same (or substantially similar) structure as that adhered to by the downlink control channel during the transmission (e.g., first transmission) of the CBGs, while the second stage $504_2$ has a length of B bits (e.g., wherein B is most any integer that is determined based on the total number of CBGs generated for the transport block 2). In yet another embodiment, control channel structures $506_1$-$506_2$ depict an example adaptive two-stage downlink control channel structure for retransmission of CBGs for a transport block 3 (e.g., having length Z; wherein Z is most any integer). During this retransmission (e.g., at time T3), the first stage $506_1$ adheres to the same (or substantially similar) structure as that adhered to by the downlink control channel during the transmission (e.g., first transmission) of the CBGs, while the second stage $506_2$ has a length of C bits (e.g., wherein C is most any integer that is determined based on the total number of CBGs generated for the transport block 3). As seen from FIG. 5, the lengths of the second stages can be varied to utilize downlink control channel bandwidth optimally and/or efficiently and in turn to improve link and system throughput.

Figure 6:
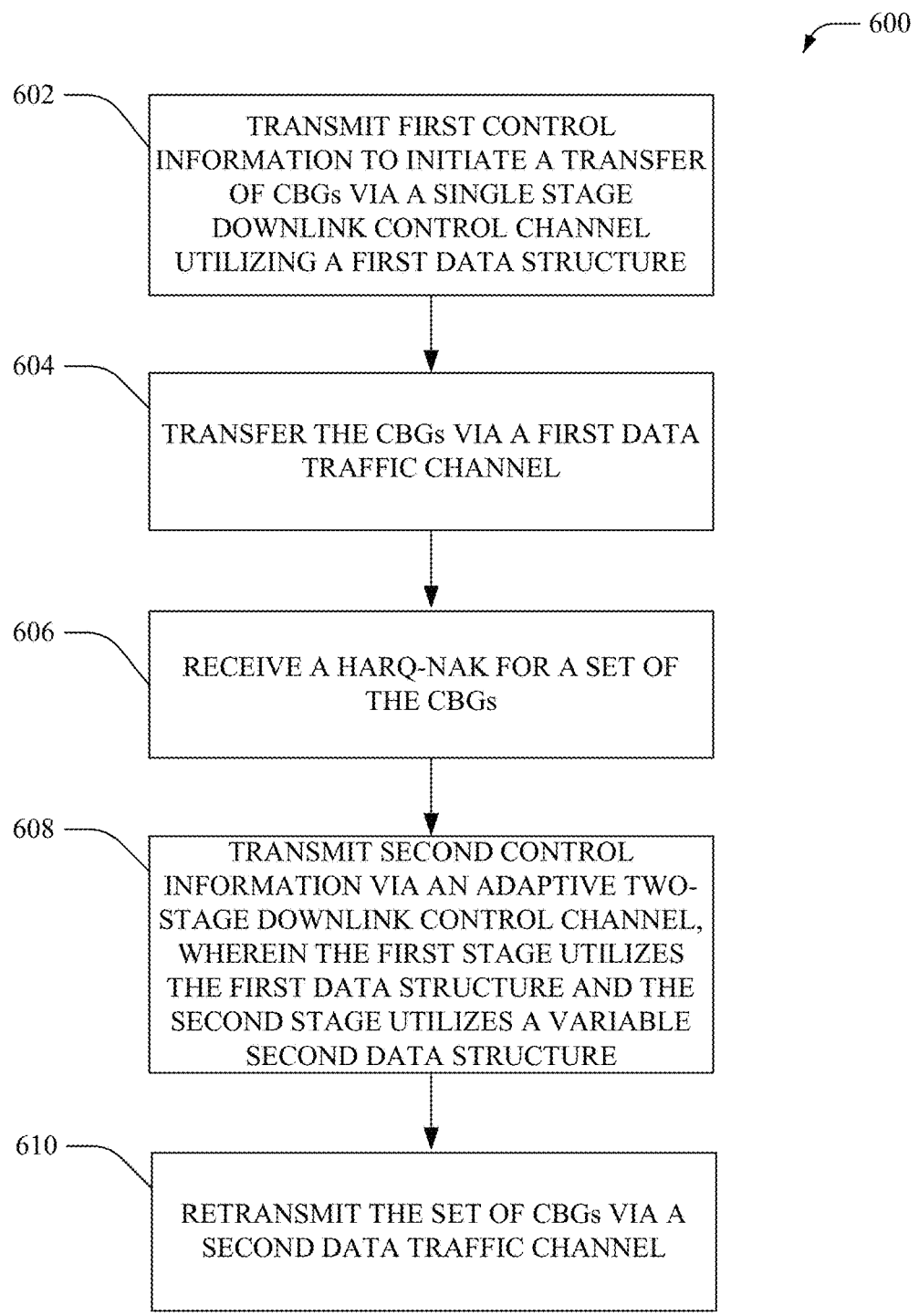
FIG. 6 illustrates an example method that facilitates a transmission of a control signal via an adaptive two-stage downlink control channel for CBG-based retransmissions.
Figure 7:
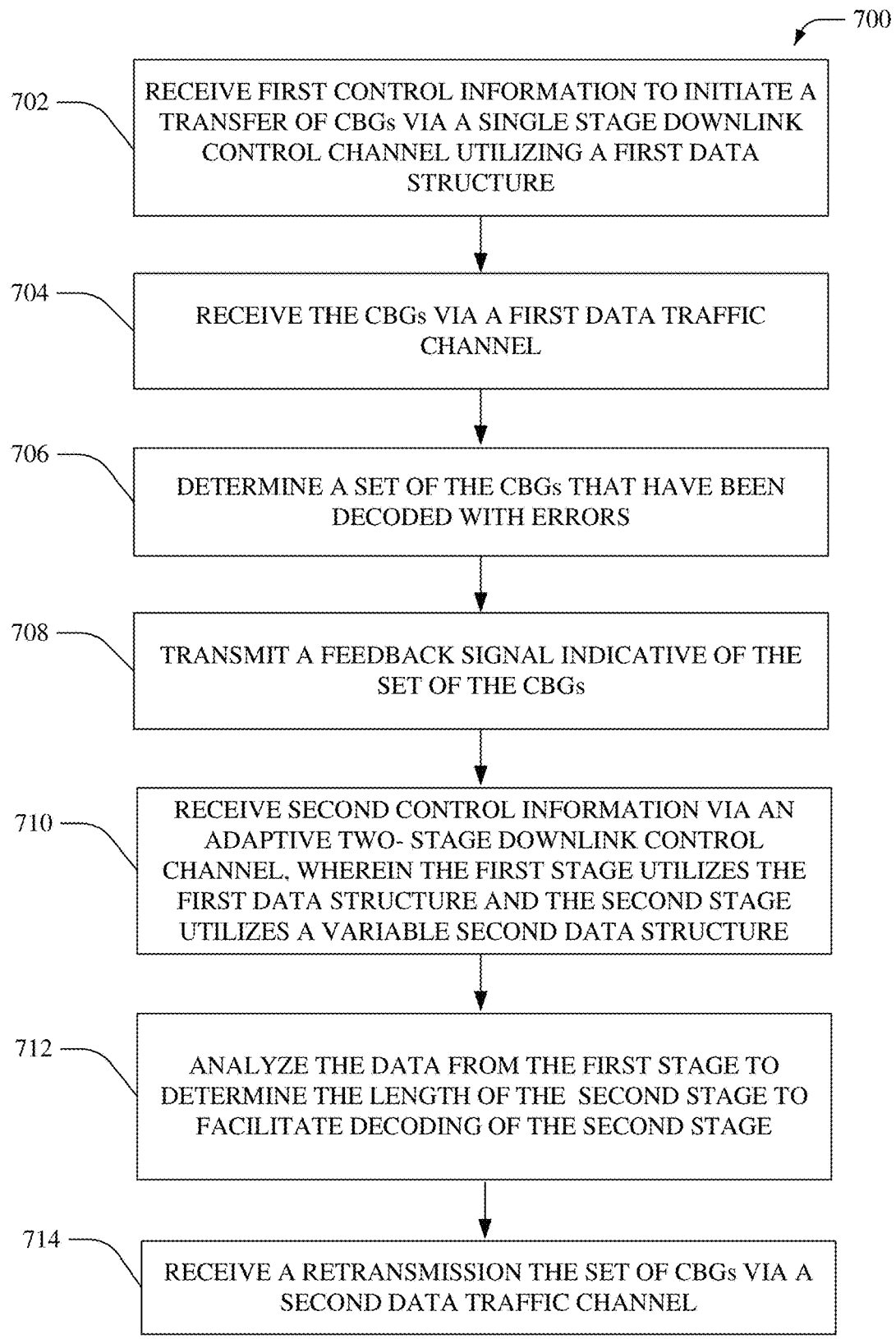
FIG. 7 illustrates an example method that facilitates a reception of a control signal via an adaptive two-stage downlink control channel for CBG-based retransmissions.

FIGS. 6-7 illustrate flow diagrams and/or methods in accordance with the disclosed subject matter. For simplicity of explanation, the flow diagrams and/or methods are depicted and described as a series of acts. It is to be understood and noted that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and note that the methods could alternatively be represented as a series of interrelated states via a state diagram or events. Additionally, it should be further noted that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 6 there illustrated is an example method 600 that facilitates a transmission of a control signal via an adaptive two-stage downlink control channel for CBG-based retransmissions, according to an aspect of the subject disclosure. In an aspect, method 600 can be implemented by one or more network devices (e.g., network device 102) of a communication network (e.g., cellular network). At 602, first control information to initiate a transfer of CBGs can be transmitted via a single stage downlink control channel that utilizes a first data structure (e.g., DCI format). As an example, the first control information can be transmitted from a network device to a UE. Based on the first control information, a first data traffic channel can be established between the network device and the UE, and at 604, the CBGs can be transferred via the first data traffic channel. At 606, a HARQ-NAK can be received for a set of the CBGs (e.g., which failed to be correctly decoded by the UE). At 608, second control information can be transmitted via an adaptive two-stage downlink control channel, wherein the first stage utilizes the first data structure and the second phase utilizes a variable second data structure. In one example, the first stage comprises scheduling data, such as, but not limited to, number of MIMO layers scheduled, transport block sizes, modulation for each codeword, parameters related to HARQ, sub band locations, and/or precoding matrix index corresponding to the sub bands. In another example, the second phase comprises an explicit indication (e.g., via a bitmap) of the CBGs that are scheduled to be transmitted (and the CBGs that are not scheduled to be transmitted). According to an embodiment, the length of the second phase is optimized to reduce signaling overhead. Moreover, in one example, the number of bits within the bitmap transmitted in the second phase comprises the total number of CBGs generated for a transport block. Based on the second control information, a second data traffic channel can be established between the network device and the UE, and at 610, the set of CBGs can be retransmitted via the second data traffic channel.

FIG. 7 illustrates an example method 700 that facilitates a reception of a control signal via an adaptive two-stage downlink control channel for CBG-based retransmission, according to an aspect of the subject disclosure. As an example, method 700 can be implemented by one or more UE (e.g., UE 104) of a communication network (e.g., cellular network). At 702, first control information to initiate a transfer of CBGs can be received via a single stage downlink control channel that utilizes a first data structure (e.g., DCI format). As an example, the first control information can be transmitted from a network device (e.g., gNodeB) to the UE. Based on the first control information, a first data traffic channel can be established between the network device and the UE, and at 704, the CBGs can be received via the first data traffic channel.

Most any decoding mechanisms can be utilized to decode the CBGs. At 706, a set of the CBGs that have been decoded with errors can be determined. At 708, a feedback signal (e.g., HARQ-NAK) indicative of the set of the CBGs can be transmitted to the network device. At 710, second control information can be received via an adaptive two-stage downlink control channel, wherein the first stage utilizes the first data structure and the second phase utilizes a variable second data structure. At 712, data from the first stage can be analyzed to determine the length of the second stage to facilitate decoding of the second stage. The first stage can be decoded and once the decoding is successful, the number of resources allocated for retransmission and/or the modulation scheme can be determined. In one example, the first stage can include scheduling data, comprising, but not limited to the length of the transport block (e.g., that is used to generate the CBGs). Based on the length of the transport block, the total number of CBGs and thus, the length of the second phase can be determined. Further, based on the length of the second phase, the decoding technique for the CBGs can be selected and utilized. In one example, Reed-Muller code is utilized to decide the second phase, when the length of the CBGs (number of bits) is equal or less than 11. In another example, the polar code can be utilized for decoding if the second phase, when the length of the CBGs (number of bits) is greater than 11. Based on the second control information, a second data traffic channel can be established between the network device and the UE, and at 714, a retransmission of the set of CBGs can be received via the second data traffic channel.

In one aspect, the systems 100-400 and methods 600-700 disclosed herein provide various non-limiting advantages, for example, (i) reduced signaling overhead for downlink control channel, there by efficiently allocating the resources for control channel; (ii) improving the link and system throughput.

Figure 8:
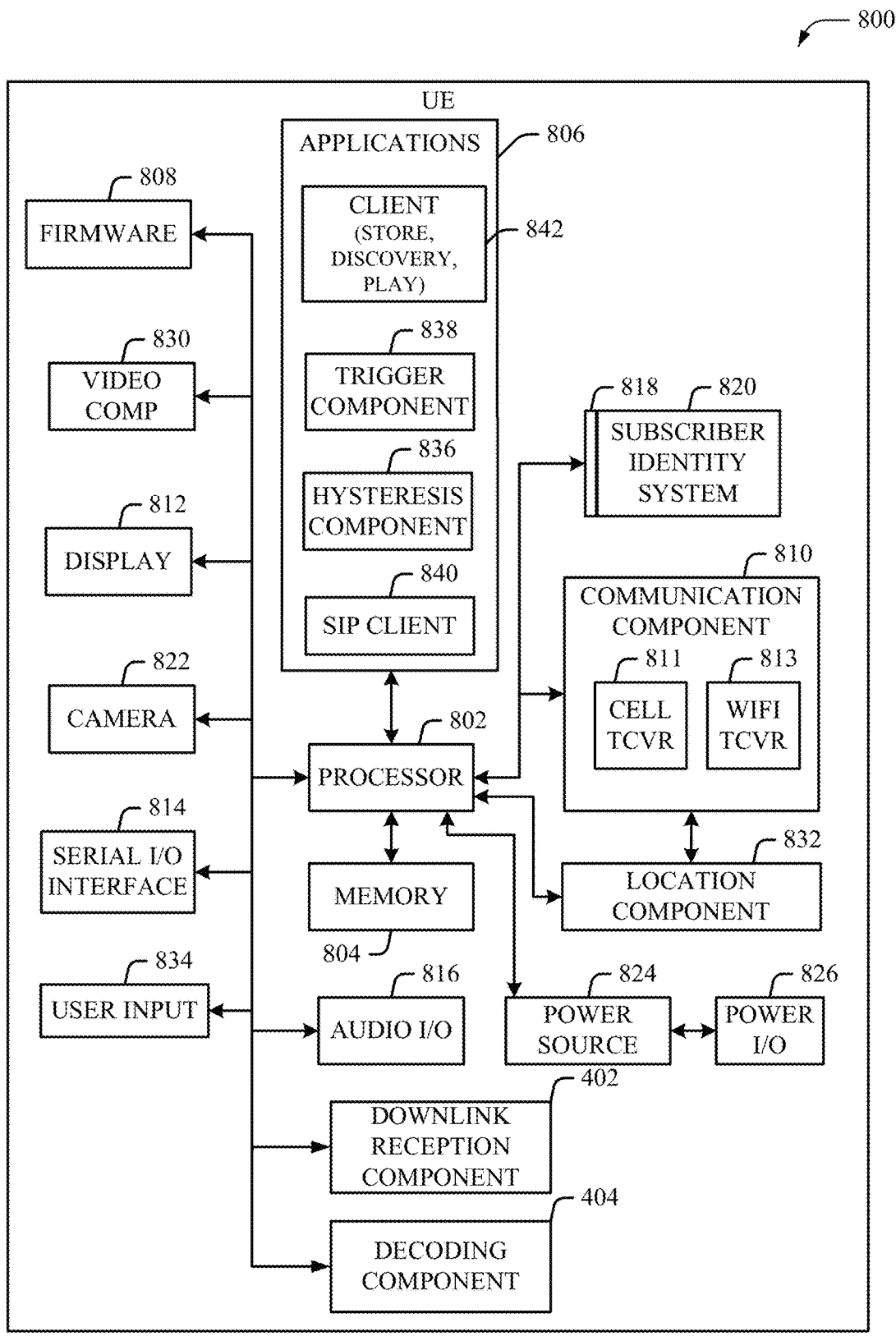
FIG. 8 illustrates an example block diagram of a user equipment operable to engage in a system architecture that facilitates wireless communications according to one or more embodiments described herein.

Referring now to FIG. 8, illustrated is an example block diagram of an example UE 800 operable to engage in a system architecture that facilitates wireless communications according to one or more embodiments described herein. UE 104 described herein is substantially similar to UE 800 and can comprise functionality as more fully, for example, as described herein with regard to UE 800.

The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

The UE includes a processor 802 for controlling and processing all onboard operations and functions. A memory 804 interfaces to the processor 802 for storage of data and one or more applications 806 (e.g., a video player software, user feedback component software, etc.). Other applications can include voice recognition of predetermined voice commands that facilitate initiation of the user feedback signals. The applications 806 can be stored in the memory 804 and/or in a firmware 808, and executed by the processor 802 from either or both the memory 804 or/and the firmware 808. The firmware 808 can also store startup code for execution in initializing the UE 800. A communications component 810 interfaces to the processor 802 to facilitate wired/wireless communication with external systems, e.g., cellular networks, VoIP networks, and so on. Here, the communications component 810 can also include a suitable cellular transceiver 811 (e.g., a GSM transceiver) and/or an unlicensed transceiver 813 (e.g., Wi-Fi, WiMax) for corresponding signal communications. The UE 800 can be a device such as a cellular telephone, a PDA with mobile communications capabilities, and messaging-centric devices. The communications component 810 also facilitates communications reception from terrestrial radio networks (e.g., broadcast), digital satellite radio networks, and Internet-based radio services networks.

The UE 800 includes a display 812 for displaying text, images, video, telephony functions (e.g., a Caller ID function), setup functions, and for user input. For example, the display 812 can also be referred to as a "screen" that can accommodate the presentation of multimedia content (e.g., music metadata, messages, wallpaper, graphics, etc.). The display 812 can also display videos and can facilitate the generation, editing and sharing of video quotes. A serial I/O interface 814 is provided in communication with the processor 802 to facilitate wired and/or wireless serial communications (e.g., USB, and/or IEEE 1394) through a hardwire connection, and other serial input devices (e.g., a keyboard, keypad, and mouse). This supports updating and troubleshooting the UE 800, for example. Audio capabilities are provided with an audio I/O component 816, which can include a speaker for the output of audio signals related to, for example, indication that the user pressed the proper key or key combination to initiate the user feedback signal. The audio I/O component 816 also facilitates the input of audio signals through a microphone to record data and/or telephony voice data, and for inputting voice signals for telephone conversations.

The UE 800 can include a slot interface 818 for accommodating a SIC (Subscriber Identity Component) in the form factor of a card Subscriber Identity Module (SIM) or universal SIM 820, and interfacing the SIM card 820 with the processor 802. However, it is to be appreciated that the SIM card 820 can be manufactured into the UE 800, and updated by downloading data and software.

The UE 800 can process IP data traffic through the communications component 810 to accommodate IP traffic from an IP network such as, for example, the Internet, a corporate intranet, a home network, a person area network, etc., through an ISP or broadband cable provider. Thus, VoIP traffic can be utilized by the UE 800 and IP-based multimedia content can be received in either an encoded or a decoded format.

A video processing component 822 (e.g., a camera) can be provided for decoding encoded multimedia content. The video processing component 822 can aid in facilitating the generation, editing, and sharing of video quotes. The UE 800 also includes a power source 824 in the form of batteries and/or an AC power subsystem, which power source 824 can interface to an external power system or charging equipment (not shown) by a power I/O component 826.

The UE 800 can also include a video component 830 for processing video content received and, for recording and transmitting video content. For example, the video component 830 can facilitate the generation, editing and sharing of video quotes. A location-tracking component 832 facilitates geographically locating the UE 800. As described hereinabove, this can occur when the user initiates the feedback signal automatically or manually. A user input component 834 facilitates the user initiating the quality feedback signal. The user input component 834 can also facilitate the generation, editing and sharing of video quotes. The user input component 834 can include such conventional input device technologies such as a keypad, keyboard, mouse, stylus pen, and/or touch screen, for example.

Referring again to the applications 806, a hysteresis component 836 facilitates the analysis and processing of hysteresis data, which is utilized to determine when to associate with the access point. A software trigger component 838 can be provided that facilitates triggering of the hysteresis component 836 when the Wi-Fi transceiver 813 detects the beacon of the access point. A SIP client 840 enables the UE 800 to support SIP protocols and register the subscriber with the SIP registrar server. The applications 806 can also include a client 842 that provides at least the capability of discovery, play and store of multimedia content, for example, music.

The UE 800, as indicated above related to the communications component 810, includes an indoor network radio transceiver 813 (e.g., Wi-Fi transceiver). This function supports the indoor radio link, such as IEEE 802.11, for the dual-mode GSM UE 800. The UE 800 can accommodate at least satellite radio services through a UE that can combine wireless voice and digital radio chipsets into a single handheld device. Further, UE 800 can comprise the downlink reception component 402 and the decoding component 404, which can comprise functionality as more fully described herein, for example, as described above with regard to system 400.

Figure 9:
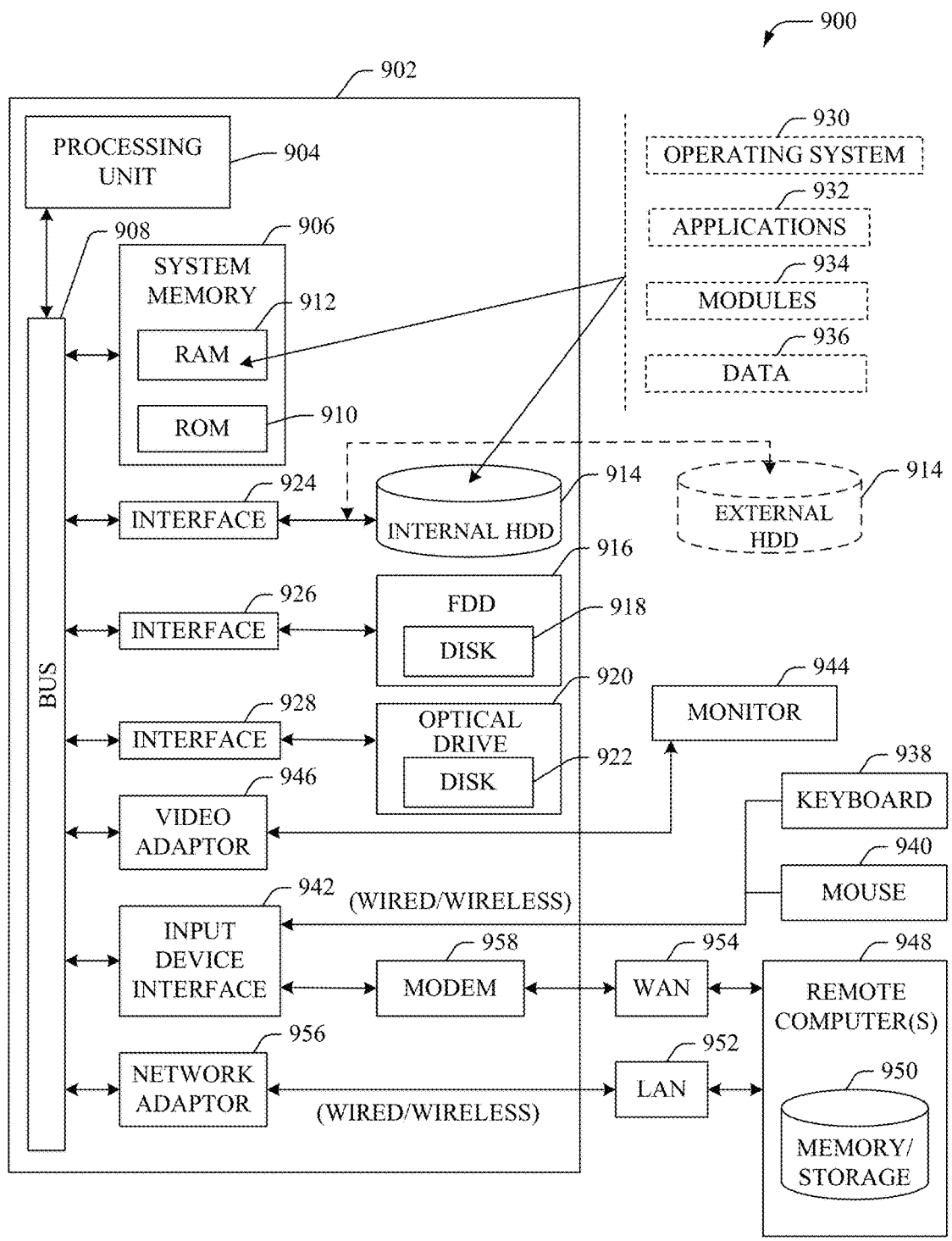
FIG. 9 illustrates a block diagram of a computer operable to execute the disclosed communication architecture.

Referring now to FIG. 9, there is illustrated a block diagram of a computer 902 operable to execute the disclosed communication architecture. In order to provide additional context for various aspects of the disclosed subject matter, FIG. 9 and the following discussion are intended to provide a brief, general description of a suitable computing environment 900 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, applications (e.g., program modules) comprise routines, programs, components, data structures, etc., that perform particular tasks or implement particular abstract data types. Moreover, those skilled in the art will note that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, radio frequency (RF), infrared and other wireless media. Combinations of the any of the above should also be included within the scope of computer-readable media.

With reference again to FIG. 9, the example environment 900 for implementing various aspects of the specification comprises a computer 902, the computer 902 comprising a processing unit 904, a system memory 906 and a system bus 908. As an example, the component(s), application(s) server(s), equipment, system(s), interface(s), gateway(s), controller(s), node(s), entity(ies), function(s), cloud(s) and/ or device(s) (e.g., network device 102, UE 104, feedback reception component 202, retransmission component 204, data transfer component 206, LDPC coder 308, downlink reception component 402, decoding component 404, stage 1 decoder 406, stage 2 decoder 408, UE 800, etc.) disclosed herein with respect to systems 100-500 can each comprise at least a portion of the computer 902. The system bus 908 couples system components comprising, but not limited to, the system memory 906 to the processing unit 904. The processing unit 904 can be any of various commercially available processors. Dual microprocessors and other multiprocessor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 comprises read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during startup. The RAM 912 can also comprise a high-speed RAM such as static RAM for caching data.

The computer 902 further comprises an internal hard disk drive (HDD) 914, which internal hard disk drive 914 can also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations comprises at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to a HDD, a removable magnetic diskette, and a removable optical media such as a CD or DVD, it should be noted by those skilled in the art that other types of storage media which are readable by a computer, such as zip drives, magnetic cassettes, flash memory cards, solid-state disks (SSD), cartridges, and the like, can also be used in the example operating environment, and further, that any such storage media can contain computer-executable instructions for performing the methods of the specification.

A number of program modules can be stored in the drives and RAM 912, comprising an operating system 930, one or more application programs 932, other program modules 934 and program data 936. All or portions of the operating system, applications, modules, and/or data can also be cached in the RAM 912. It is noted that the specification can be implemented with various commercially available operating systems or combinations of operating systems.

A user can enter commands and information into the computer 902 through one or more wired/wireless input devices, e.g., a keyboard 938 and/or a pointing device, such as a mouse 940 or a touchscreen or touchpad (not illustrated). These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc. A monitor 944 or other type of display device is also connected to the system bus 908 via an interface, such as a video adapter 946.

The computer 902 can operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically comprises many or all of the elements described relative to the computer 902, although, for purposes of brevity, only a memory/storage device 950 is illustrated. The logical connections depicted comprise wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 is connected to the local network 952 through a wired and/or wireless communication network interface or adapter 956. The adapter 956 can facilitate wired or wireless communication to the LAN 952, which can also comprise a wireless access point disposed thereon for communicating with the wireless adapter 956.

When used in a WAN networking environment, the computer 902 can comprise a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be noted that the network connections shown are example and other means of establishing a communications link between the computers can be used.

The computer 902 is operable to communicate with any wireless devices or entities operatively disposed in wireless communication, e.g., desktop and/or portable computer, server, communications satellite, etc. This comprises at least Wi-Fi and Bluetooth™ wireless technologies or other communication technologies. Thus, the communication can be a predefined structure as with a conventional network or simply an ad hoc communication between at least two devices.

Wi-Fi, or Wireless Fidelity networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "cache," and substantially any other information storage component relevant to operation and functionality of a component, refer to "memory components," or entities embodied in a "memory" or components comprising the memory. It will be noted that the memory components, or computer-readable storage media, described herein can be either volatile memory or nonvolatile memory, or can comprise both volatile and nonvolatile memory. By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 10:
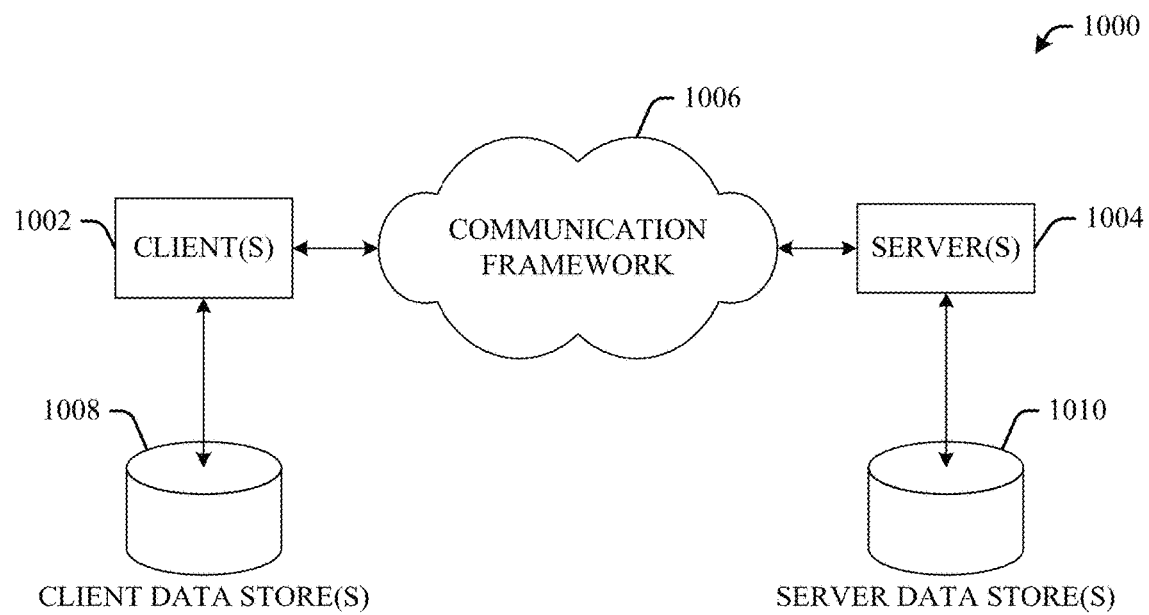
FIG. 10 illustrates a schematic block diagram of a computing environment in accordance with the subject specification

Referring now to FIG. 10, there is illustrated a schematic block diagram of a computing environment 1000 in accordance with the subject specification. The system 1000 comprises one or more client(s) 1002. The client(s) 1002 can be hardware and/or software (e.g., threads, processes, computing devices).

The system 1000 also comprises one or more server(s) 1004. The server(s) 1004 can also be hardware and/or software (e.g., threads, processes, computing devices). The servers 1004 can house threads to perform transformations by employing the specification, for example. One possible communication between a client 1002 and a server 1004 can be in the form of a data packet adapted to be transmitted between two or more computer processes. The data packet may comprise a cookie and/or associated contextual information, for example. The system 1000 comprises a communication framework 1006 (e.g., a global communication network such as the Internet, cellular network, etc.) that can be employed to facilitate communications between the client(s) 1002 and the server(s) 1004.

Communications can be facilitated via a wired (comprising optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above comprises examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
  facilitating a first transmission of first control data from a transmitter device to a receiver device, wherein the first control data is formatted in accordance with a first data structure, and wherein the first control data is employed to facilitate a transfer of a transport block from the transmitter device to the receiver device;
  directing, to the receiver device, code block groups that are determined based on segmenting the transport block; and
  in response to receiving, from the receiver device, a feedback signal that indicates an error during a communication of a code block group of the code block groups,
    facilitating, during a first stage of a control channel, a second transmission of second control data from the transmitter device to the receiver device, wherein the second control data is formatted in accordance with the first data structure, and wherein the second control data comprises length data indicative of a length of the transport block; and
    facilitating, during a second stage of the control channel, a third transmission of third control data from the transmitter device to the receiver device, wherein the third control data is indicative of the code block group and is formatted in accordance with an adaptable second data structure.

2. The system of claim 1, wherein the adaptable second data structure is determined based on the length data.

3. The system of claim 1, wherein the operations further comprise:
determining a number of the code block groups, and wherein the adaptable second data structure is determined based on the number.

4. The system of claim 1, wherein the third control data comprises a bitmap, and wherein a bit position within the bitmap that corresponds to the code block group is flagged.

5. The system of claim 1, wherein the feedback signal comprises a hybrid automatic repeat request.

6. The system of claim 1, wherein the second control data comprises assignment data indicative of a resource block assignment employable for the transfer of the code block group.

7. The system of claim 1, wherein the third control data is encoded by employing an encoding scheme that has been selected based on the adaptable second data structure.

8. The system of claim 7, wherein the operations further comprise:
in response to determining that the adaptable second data structure satisfies a defined length criterion, employing a Reed-Muller code to encode the third control data.

9. The system of claim 8, wherein the operations further comprise:
in response to determining that the adaptable second data structure does not satisfy the defined length criterion, employing a polar code to encode the third control data.

10. The system of claim 1, wherein the operations further comprise:
subsequent to the facilitating the third transmission, directing, to the receiver device, the code block group via a data traffic channel.

11. The system of claim 1, wherein the transmitter device is an access point device of a communication network and the receiver device is a user equipment coupled to the access point device.

12. The system of claim 1, wherein the receiver device is an access point device of a communication network and the transmitter device is a user equipment coupled to the access point device.

13. A method, comprising:
facilitating, by a transmitter device comprising a processor, a transmission of first control data to a receiver device, wherein the first control data employs a first data format, and wherein the first control data is employed to facilitate a transfer of a transport block from the transmitter device to the receiver device;
directing, by the transmitter device, code block groups to the receiver device, wherein the code block groups are determined based on segmenting the transport block; and
in response to receiving, from the receiver device, a feedback signal that indicates an error during a reception of a code block group of the code block groups, directing, by the transmitter device, second control data to the receiver device via an adaptive two-stage control channel, wherein the directing the second control data comprises:
  directing, during a first stage of the adaptive two-stage control channel, a first portion of the second control data that comprises length data indicative of a length of the transport block, wherein the first portion employs the first data format; and
  directing, during a second stage of the adaptive two-stage control channel, a second portion of the second control data that specifies that the code block group is scheduled to be retransmitted from the transmitter device to the receiver device, wherein the second portion employs a second data format that is varied based on the length data.

14. The method of claim 13, further comprising:
based on number of code blocks within the code block groups, determining, by the transmitter device, the second data format.

15. The method of claim 13, wherein the directing the second portion comprises directing a bitmap comprising a flagged bit that corresponds to the code block group.

16. The method of claim 13, wherein the receiving the feedback signal comprises receiving a hybrid automatic repeat request.

17. The method of claim 13, further comprising:
encoding, by the transmitter device, the second portion of the second control data based on an encoding scheme that has been selected in accordance with the second data format.

18. A non-transitory machine-readable storage medium, comprising executable instructions that, when executed by a processor, facilitate performance of operations, comprising:
receiving first control data from a transmitter device, wherein the first control data adheres to a first data format, and wherein the first control data is employable to facilitate a transfer of a transport block from the transmitter device;
based on the first control data, receiving code block groups that have been are determined based on segmenting the transport block;
in response to determining that a code block group of the code block groups has been decoded with an error, directing, to the transmitter device, a feedback signal that indicates the error; and
in response to the directing, receiving second control data from the transmitter device via an adaptive two-stage control channel, wherein the receiving the second control data comprises:
receiving, during a first stage of the adaptive two-stage control channel, a first portion of the second control data that comprises length data indicative of a length of the transport block, wherein the first portion adheres to the first data format; and
receiving, during a second stage of the adaptive two-stage control channel, a second portion of the second control data that specifies that the code block group is scheduled to be retransmitted from the transmitter device, wherein the second portion adheres to a second data format having a variable length.

19. The non-transitory machine-readable storage medium of claim 18, wherein the operations further comprise:
based on the length data, determining the second data format.

20. The non-transitory machine-readable storage medium of claim 19, wherein the operations further comprise:
based on the determining the second data format, determining a code that is to be utilized to decode the second portion.

\* \* \* \* \*